United States Patent [19]

Huang

[11] Patent Number: 5,238,231

[45] Date of Patent: Aug. 24, 1993

[54] SHOCK-ABSORBING UNITS INTERCONNECTABLE TO FORM SHOCK-ABSORBING STRUCTURES

[76] Inventor: Ing-Chung Huang, No. 15 Reh-Her 1st Street, Kaohsiung, Taiwan

[21] Appl. No.: 755,014

[22] Filed: Sep. 4, 1991

Related U.S. Application Data

[63] Continuation of Ser. No. 484,257, Feb. 26, 1990, abandoned.

[51] Int. Cl.⁵ .............................................. B60G 11/62
[52] U.S. Cl. ...................................... 267/35; 114/266; 114/345; 267/64.27; 267/122; 267/143; 267/152; 441/50; 441/45; 441/108; 441/129; 446/121; 446/128; 446/220
[58] Field of Search ...................... 267/35, 64.27, 113, 267/116, 117, 121, 122, 133, 140.3, 142, 143, 145, 151, 152; 441/40, 45, 108, 129; 114/266, 345; 446/85, 121, 128, 220

[56] References Cited

U.S. PATENT DOCUMENTS

| | | | |
|---|---|---|---|
| 1,445,486 | 2/1923 | Cats | 267/35 |
| 2,655,369 | 10/1953 | Musilli | 267/113 |
| 3,201,111 | 8/1965 | Afton | 267/35 X |
| 4,011,614 | 3/1977 | Bell | 441/108 |
| 5,000,713 | 3/1991 | Cheng | 446/128 X |

Primary Examiner—George E. A. Halvosa
Attorney, Agent, or Firm—Jacobson, Price, Holman & Stern

[57] ABSTRACT

A mono-air-cell body made of a flexible elastic material and having a hollow interior and no less than one connecting tube for connecting different mono-air-cell bodies together one after another, for making up a shock-absorbing cushion. Each mono-air-cell body can have any shape in its top plan view. Each connecting tube can be a male one having at least one round circumferential groove or a female one having at least one round circumferential ridge so that the male and the female connecting tubes can be joined together, thereby connecting two mono-air-cell bodies together. The shock-absorbing cushion can be composed to have a shape of a band, a plane, a sphere or any three-dimensional shape.

17 Claims, 10 Drawing Sheets

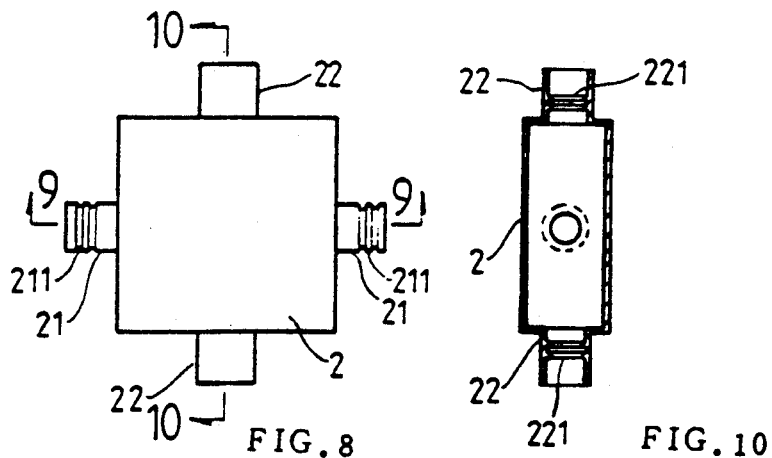
FIG. 8
FIG. 10
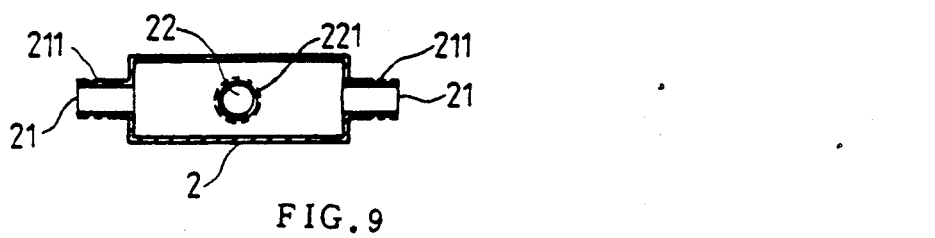
FIG. 9
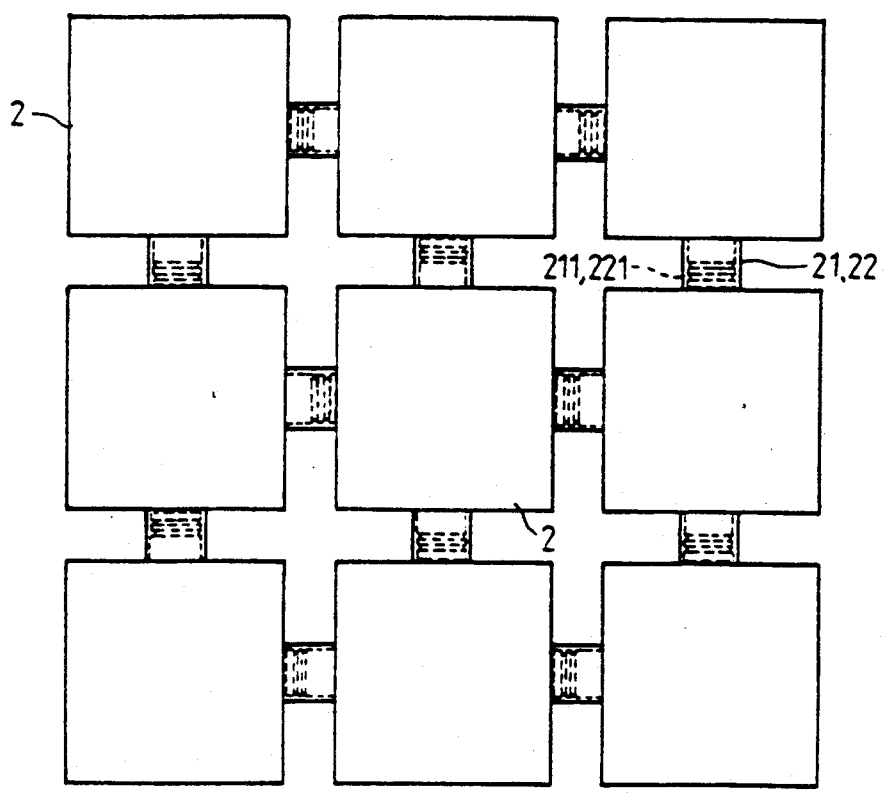
FIG. 11

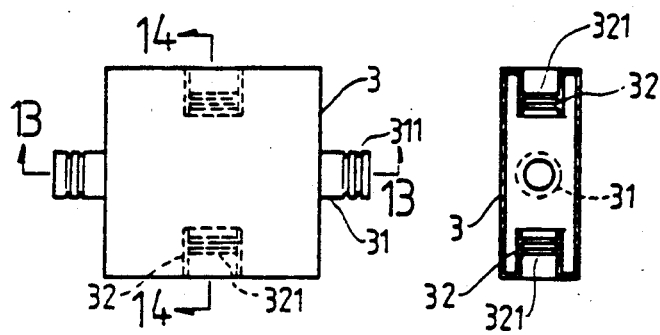
FIG.12 FIG.14
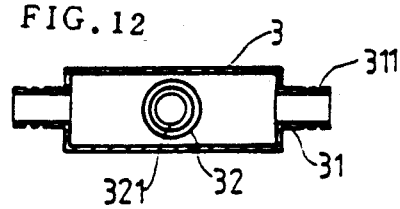
FIG.13
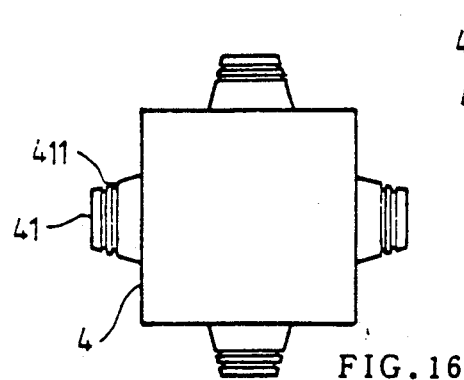
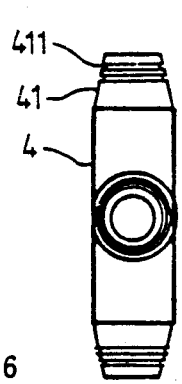
FIG.17
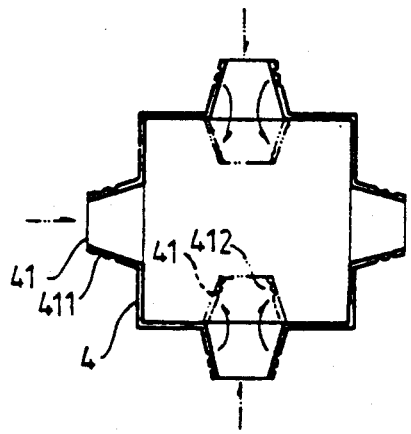
FIG.18
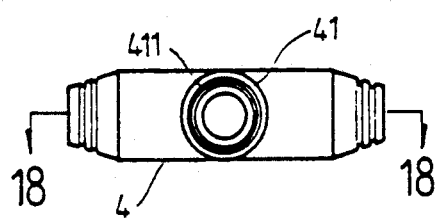
FIG.15

SHOCK-ABSORBING UNITS INTERCONNECTABLE TO FORM SHOCK-ABSORBING STRUCTURES

This is a continuation of application Ser. No. 07/484,257 filed Feb. 26, 1990 (now abandoned).

BACKGROUND OF THE INVENTION

At present, known shock-absorbing materials include air-cell cloth as well as foam rubber and plastic. The air-cell cloth comprises two layers, one upper and one lower, heat-sealed together at their circumferential edge. A plurality of air cells is contained and bulges between the two layers. Each air cell is empty, but has an atmospheric pressure, which can function as a shock-aborber, as the atmospheric pressure generates an anti-shock force when it receives an exterior pressure because of the principle $P1.V1 = P2.V2$. Nevertheless, the inner pressure of the air-cell cloth is constant, and every air cell does not communicate with each other, having the following disadvantages.

1. Each air cell in the common conventional air-cell cloth has a constant inner pressure so that its shock-absorbing effect is also constant, and is impossible to be changed to cope with different circumstances.
2. Most air-cell cloth is made to have a flat surface. If any of the air cells should be damaged or broken, it could not be repaired, thereby impairing the shock-absorbing effect.
3. Most air-cell cloth is flat, rendering it impossible to be directly used for three-dimensioned things, except for folding it around them.
4. Most air-cell cloth is provided with independent air cells not communicating with one another so that the inner pressure of the cloth is not adjustable according to necessity, thereby restricting its use.

OBJECTS OF THE INVENTION

In view of the disadvantages just described about the conventional air-cell cloth, this invention has been devised to furnish a mono-air-cell body or shock-absorbing unit with the following purpose and effect.

1. A mono-air-cell body can be connected to another to become a shock-absorbing cushion band of any length.
2. A mono-air-cell body can be connected to another to become a shock-absorbing cushion of a net shape.
3. A mono-air-cell body can be connected to another to make up a shock-absorbing cushion of a plane shape.
4. A mono-air-cell body can be connected to another to make up a shock-absorbing cushion of three dimensions.
5. A mono-air-cell body is adjustable for different purposes in its inner pressure and is connectable to another to make up a shock-absorbing cushion of a band shape, a net shape, a plane shape or a three-dimensional shape.
6. A mono-air-cell body is connectable to another to make up a shock-absorbing cushion. Any broken mono-air-cell body in said cushion is replaceable with a new one so as to keep the cushion in working order.

SUMMARY OF THE INVENTION

The mono-air-cell body according to the present invention is made of a flexible and elastic material, is provided with a hollow interior and has no less than one connecting tube. The body can have any outward shape, e.g. square, rectangular, round, triangular, etc. in its top plan view.

The connecting tube can be a male connecting tube or a female connecting tube. The male and female connecting tubes of different mono-air-cell bodies can be connected with each other so that the mono-air-cell bodies make up a shock-absorbing cushion.

The male connecting tube is provided with no less than one round circumferential groove on its outer surface, and the female connecting tube with no less than one round circumferential ridge on its inner surface. Therefore, the groove in the male connecting tube and the ridge in the female connecting tube can engage with each other when both the connecting tubes are connected. The male and female connecting tubes can be made to have a tapered surface instead of a straight surface. Also, the female connecting tube can be set to extend inside the mono-air-cell body instead of extending outside.

A shock-absorbing cushion can be composed of these mono-air-cell bodies connected with the connecting tubes, and the shock-absorbing cushion can have any shape, such as a band, a plane, a net, a three-dimensional shape, etc. by different ways of connecting the mono-air-cell bodies. Even a spherical shock-absorbing cushion can be composed of these mono-air-cell bodies.

A shock-absorbing cushion can also include two independent groups of the mono-air-cell bodies connected to communicate with one another. Each independent group is composed of a plurality of the mono-air-cell bodies connected and communicating with one another so that their hollow interiors can be filled with a gas, a liquid, etc. through a hollow tube attached to a mono-air-cell body in the group. The two independent groups are combined together to make up a whole shock-absorbing cushion, by interposing the mono-air-cell bodies in one group between those in the other group.

In addition, a shock-absorbing cushion can be made up of two separate layers each composed of the mono-cell-bodies.

BRIEF DESCRIPTION OF THE DRAWINGS

FIG. 8 is a top plan view of the third example of the mono-air-cell body in accordance with the present invention.

FIG. 9 is a cross-sectional view taken on line 9—9 of FIG. 8.

FIG. 10 is a cross-sectional view taken on line 10—10 of FIG. 8.

FIG. 11 is a top plan view of a shock-absorbing cushion composed of the third example of the mono-air-cell body in accordance with the present invention.

FIG. 12 is a top plan view of fourth example of the mono-air-cell body in accordance with the present invention.

FIG. 13 is a cross-sectional view taken on line 13—13 of FIG. 12.

FIG. 14 is a cross-sectional view taken on line 14—14 of FIG. 12.

FIG. 15 is a front view of a fifth example of the mono-air-cell body in accordance with the present invention.

FIG. 16 is a top plan view of the fifth example of the mono-air-cell body in accordance with the present invention.

FIG. 17 is a side view of the fifth example of the mono-air-cell body in accordance with the present invention.

FIG. 18 is a cross-sectional view taken on line 18—18 of FIG. 15.

DETAILED DESCRIPTION OF THE PREFERRED EMBODIMENTS

Figure 1:
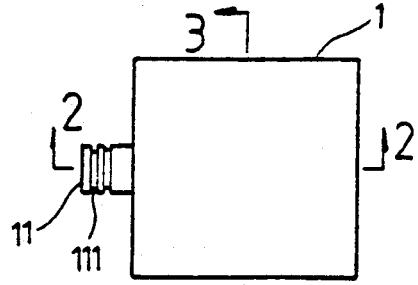
FIG. 1 is a top plan view of a first example of the mono-air-cell body in accordance with the present invention.
Figure 3:
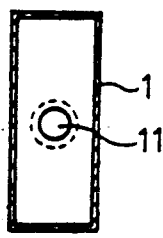
FIG. 3 is a cross-sectional view taken on line 3—3 of FIG. 1.
Figure 2:
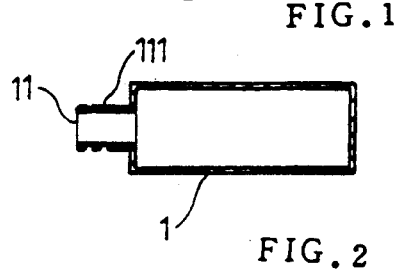
FIG. 2 is a cross-sectional view taken on line 2—2 of FIG. 1.
Figure 4:
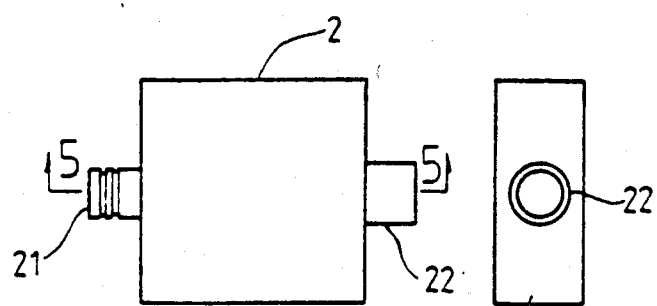
FIG. 4 is a top plan view of a second example of the mono-air-cell body in accordance with the present invention.
Figure 6:
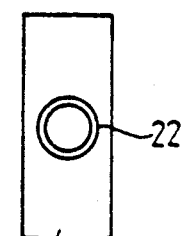
FIG. 6 is a cross-sectional view taken on line 6—6 of FIG. 4.
Figure 5:
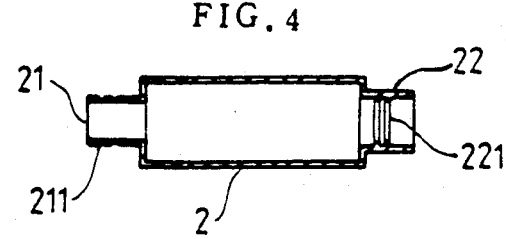
FIG. 5 is a cross-sectional view taken on line 5—5 of FIG. 4.

The first example of the mono-air-cell body 1 in accordance with the present invention shown in FIGS. 1, 2 and 3 comprises a hollow interior and a connecting tube 11 extending outwardly for connection with tube 22 in the second example of the mono-air-cell body 2 shown in FIGS. 4, 5 and 6.

The second example of the mono-air-cell body 2 also comprises a hollow interior adapted to be filled with air, etc. and more than one connecting tube to connect with the mono-air-cell body 1 or another mono-air-cell body 2.

The shape of the mono-air-cell body 1 or 2 in its top plan view can be a square, a circle, a triangle, three dimensioned, multi-sided or of any geometrical shape. The mono-air-cell body 2 has at least one male connecting tube 21 and one female connecting tube 22 for combining with the mono-air-cell body 1 or another mono-air-cell body 2.

Figure 7:
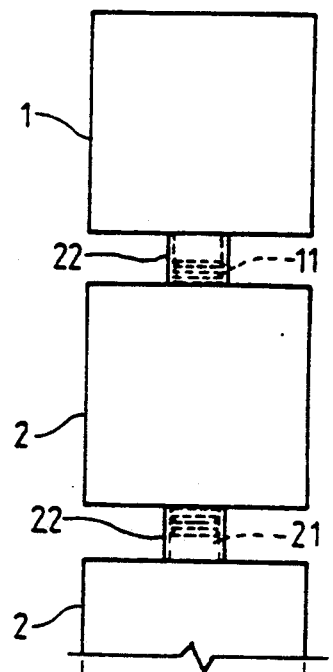
FIG. 7 is a top plan, broken-away view of a shock-absorbing cushion composed of the first and the second examples of the mono-air-cell body in accordance with the present invention.

The male connecting tube 11 or 21 in the mono-air-cell body 1 or 2 is provided with no less than one round circumferential groove 111 or 211, and the female connecting tube 22 is provided with no less than one circumferential ridge 221 on the inner wall, and thereby said groove 111 or 211 and said ridge 221 can engage with each other when both tubes 11 or 21 and 22 are connected together. A shock-absorbing cushion of a band shape shown in FIG. 7 can be composed of the mono-air-cell bodies 1 with one connecting tube 11 or 21 and the mono-air-cell bodies 2 with one or two pairs of connecting tubes 21 and 22.

The third example of the mono-air-cell body 2 shown in FIGS. 8, 9 and 10 comprises two male connecting tubes 21 and two female connecting tubes 22, said male tubes 21 aligning with each other and said female tubes aligning with each other, said male tubes 21 and said female tubes 22 set on cross lines so that a shock-absorbing cushion of a net structure can be composed of the mono-air-cell bodies 1 and 2, as shown in FIG. 11.

The fourth example of the mono-air-cell body 3 shown in FIGS. 12, 13 and 14 comprises at least one connecting tube, and one male connecting tube 31 and one female connecting tube 32 if there are two connecting tubes. The male tube 31 extends outside the body 3, but the female tube 32 extends inside the body 3 for those tubes in the adjacent bodies 3 to connect with one another. The male connecting tube 31 is provided with at least one round circumferential groove 311, and the female connecting tube with at least one round circumferential ridge.

The fifth example of the mono-air-cell body 4 shown in FIGS. 15, 16, 17 and 18 comprises at least one connecting tube 41, male or female, of tapered surface, and each tube 41 is provided with one round circumferential groove 411 or one round circumferential ridge 412 so that a male connecting tube 41 extending outside the body 4 can engage with a female connecting tube 41 extending inside the body 4.

Figure 19:
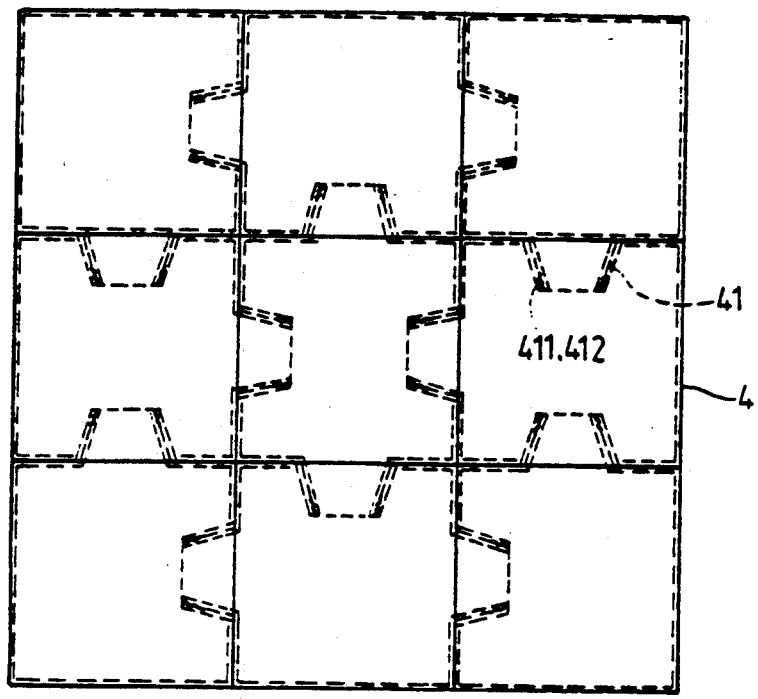
FIG. 19 is a top plan view of a shock-absorbing cushion composed of the fifth example of the mono-air-cell body in accordance with the present invention.
Figure 20:
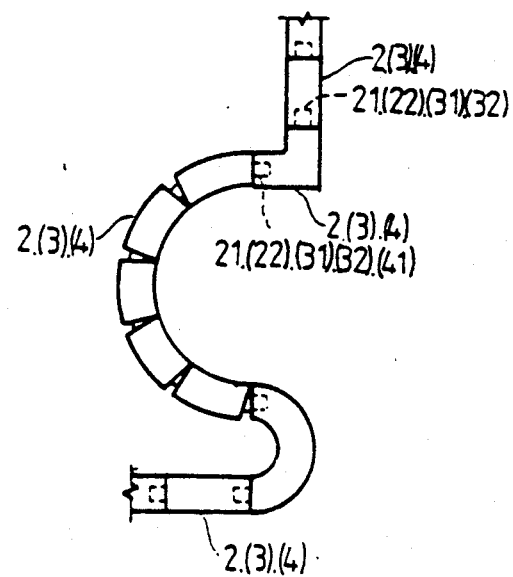
FIG. 20 is a top plan, broken-away view of a shock-absorbing cushion composed of the second, the third, and the fourth examples of the mono-air-cell body in accordance with the present invention.

FIG. 19 shows that a planar shock-absorbing cushion can be composed of the mono-air-cell bodies 4. FIG. 20 shows that a shock-absorbing cushion with three dimensions or any curved shape can be composed of the mono-air-cell bodies 2, 3 or 4 by means of the connecting tubes 21, 22, 31, 32 and 41 connected with one another at different angles.

In addition, the connecting tubes 11, 21, 31 and 41 can be attached to a one-way valve, a pressure-adjustable valve, a pressure gauge, an inflating valve, etc.

Figure 21:
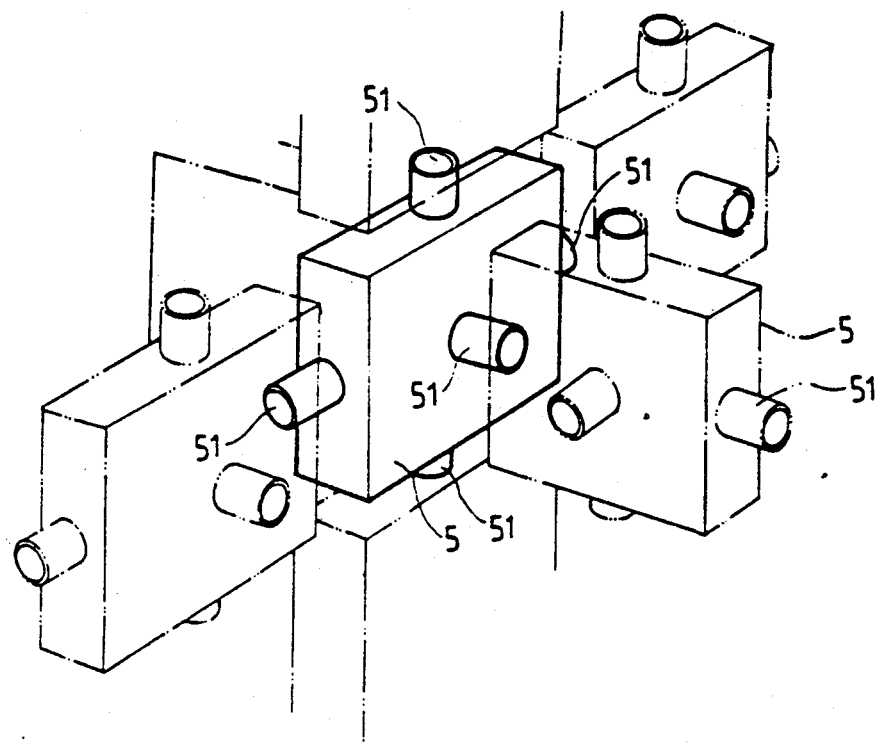
FIG. 21 is a perspective view of a sixth example of the mono-air-cell body and a shock-absorbing cushion composed of said example in accordance with the present invention.

Referring to FIG. 21, the sixth example of the mono-air-cell body 5 is provided with six connecting tubes 51 separately at different sides, and each tube 51 can be made to have the same angle or a different angle from one another according to necessity. In addition, at least one of the six tubes 51 must be a male tube or a female tube to connect with a female or a male tube of the adjacent body 5; or the number of the male tubes can be equal to or different from that of the female tubes in cooperation with the purpose of the shock-absorbing cushion.

Figure 22:
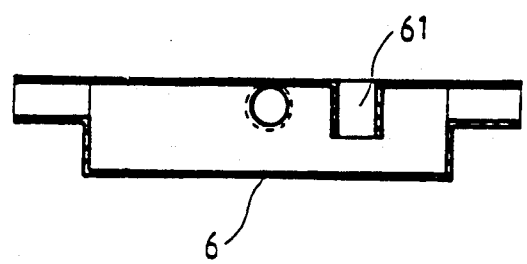
FIG. 22 is a cross-sectional view of a seventh example of the mono-air-cell body in accordance with the present invention.

FIG. 22 shows the seventh example of the mono-air-cell body 6 comprising a hollow tube 61 extending in the interior of the body 6 for attaching a component such as an air valve, a pressure-adjusting valve, an inflating valve, etc. hidden in the body 6.

Figure 23:
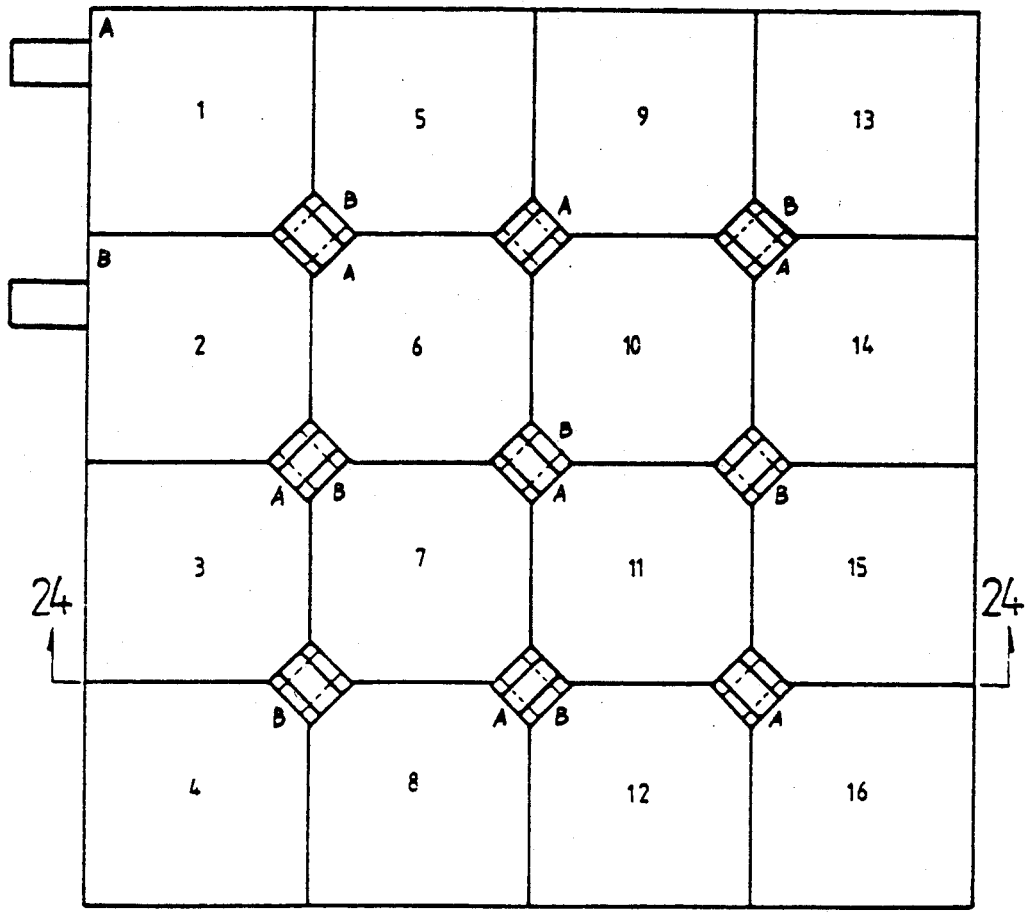
FIG. 23 is a top plan view of a shock-absorbing cushion including independent groups composed of the mono-air-cell bodies in accordance with the present invention.
Figure 24:
FIG. 24 is a cross-sectional view taken on line 24—24 of FIG. 23.

FIGS. 23 and 24 show a planar shock-absorbing cushion including two independent groups A and B of the mono-air-cell bodies separately communicating with one another. Each group A or B comprises a plurality of the mono-air-cell bodies, which are connected at their connecting tubes to make up a shock-absorbing cushion of a net structure. The cushion has one mono-air-cell body provided with an inflating valve extending outside the mono-air-cell body for inflating a gas in the group A. Similarly, the group B has the same number of the mono-air-cell bodies connected in the same way as the group A, and has the same valve for inflating a gas in the group B. The mono-air-cell bodies of group A and those of group B are interposed between one another, thereby constituting a planar shock-absorbing cusion constituted of two net-shaped shock-absorbing cushions. Even if one of the two groups A and B should happen to have a mono-air-cell body broken, the other group still could maintain the shock-absorbing function. The mono-air-cell bodies marked 1, 3, 6, 8, 9, 11, 14 and 16 belong to the group A and those marked 2, 4, 5, 7, 10, 12, 13 and 15 to the group B in FIG. 23.

Figure 25:
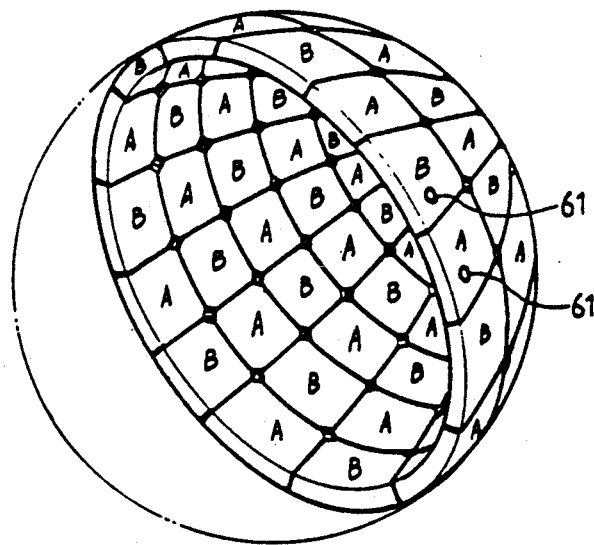
FIG. 25 is a perspective view of a shock-absorbing cushion of a spherical shape including two independent groups of the mono-air-cell bodies in accordance with the present invention.

FIG. 25 shows a spherical shock-absorbing cushion including independent groups A and B composed of the mono-air-cell bodies separately connected and communicating with one another at their connecting tubes. Each independent group is shaped as a net and has the mono-air-cell bodies interposed between one another.

Figure 26:
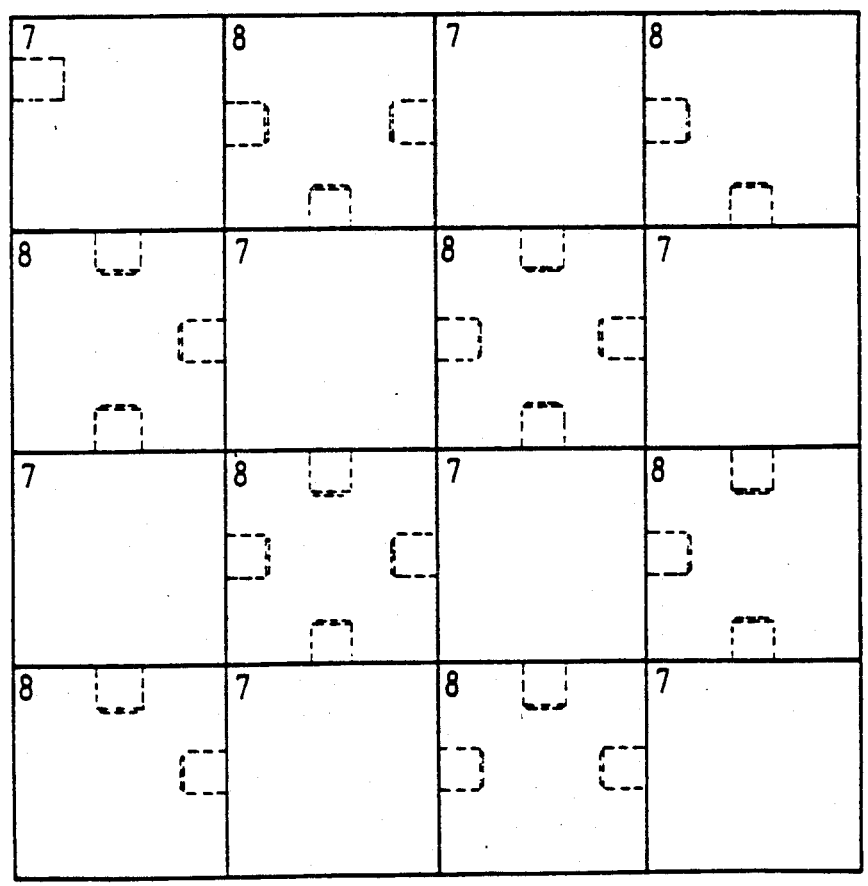
FIG. 26 is a top plan view of a shock-absorbing cushion of a plane shape including two independent groups composed of the mono-air-cell bodies in accordance with the present invention.

FIG. 26 shows a different shock-absorbing cushion composed of the eighth example of a male mono-air-cell body 7 and a female mono-air-cell body 8. The male mono-air-cell body 7 is provided with connecting tubes attached with a one-way valve, and the female mono-air-cell body 8 with connecting tubes only. The male and the female mono-air-cell bodies 7 and 8 are so connected that they are interposed between one another. If any male mono-air-cell body breaks, then those female mono-air-cell bodies 8 communicating with the broken mono-air-cell body 7 may lose gas. However, the rest of the male and the female mono-air-cell boeies 7 and 8 may still remain inflated. Also, the mono-air-cell body broken can be replaced with a new one to recover the function of this shock-absorbing cushion.

Figure 27:
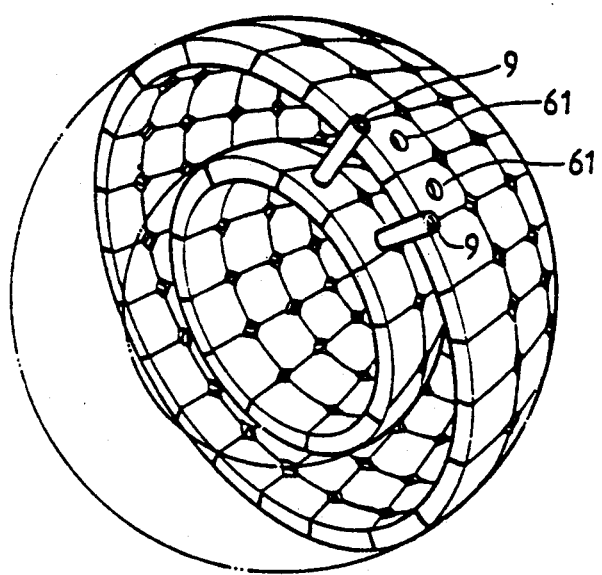
FIG. 27 is a perspective view of a shock-absorbing cushion including two separate layers with two independent groups composed of the mono-air-cell bodies in accordance with the present invention.
Figure 28:
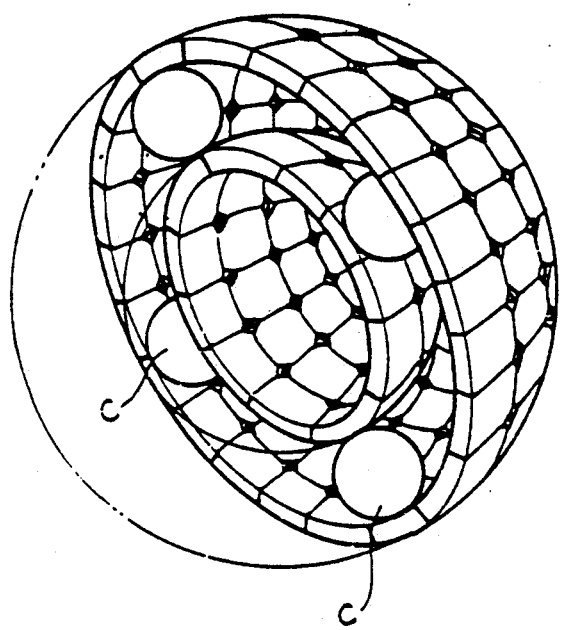
FIG. 28 is a perspective view of the cushion of FIG. 27 with extra added inflated balls between both the layers.

FIG. 27 shows a spherical multi-layer shock-absorbing cushion, each layer having the same center, composed of the mono-air-cell bodies in a way similar to that shown in FIG. 25. Each layer is provided with a hollow tube 9 for attaching an inflating valve, a one-way valve, a pressure-adjusting valve, or a pressure gauge, and those mono-air-cell bodies in each layer can be filled with the same element, such as air, a heat-preserving material, a colloid, a liquid, etc.

FIG. 22 shows a spherical multi-layer shock-absorbing cushion, each layer having the same center similar to that shown in FIG. 27, but balls C are additionally interposed between two layers. The balls C support the inner layer from falling and prevent both layers from moving together.

Figures 29, 30:
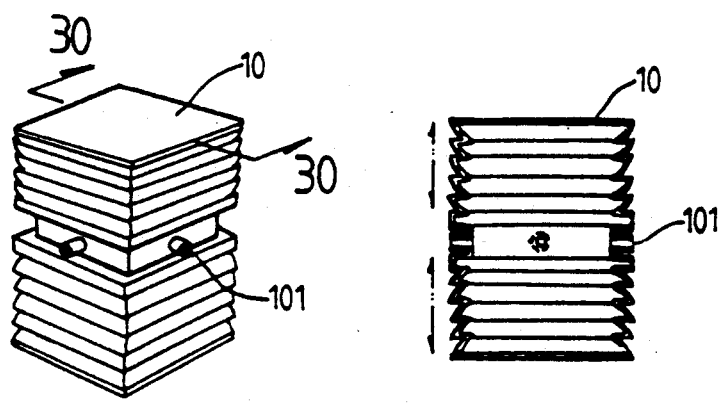
FIG. 29 is a perspective view of an eighth example of the mono-air-cell body in accordance with the present invention.
FIG. 30 is a cross-sectional view taken on line 30—30 of FIG. 29.
Figure 31:
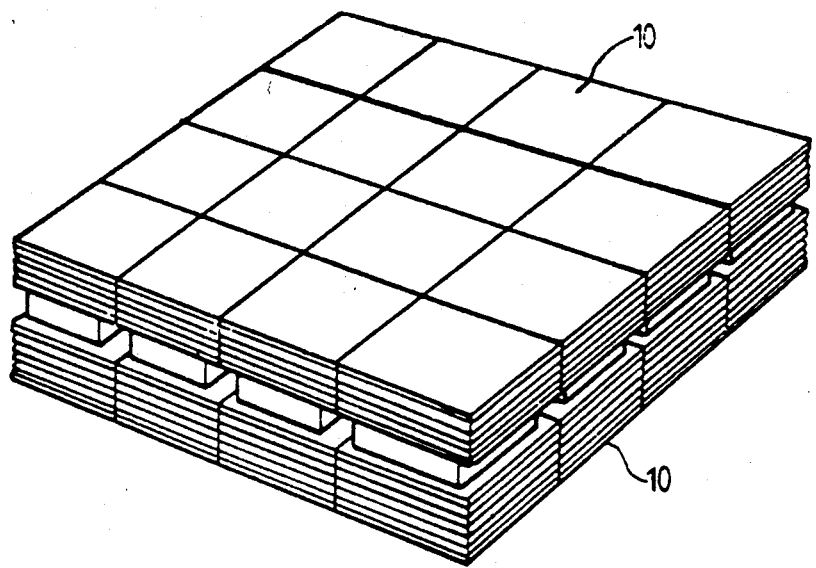
FIG. 31 is a perspective view of a shock-absorbing cushion composed of the eighth example of the mono-air-cell bodies in accordance with the present invention.

FIGS. 29 and 30 show one more different example of a mono air-cell body 10, and FIG. 31 shows a shock-absorbing cushion composed of these mono-air-cell bodies. The mono-air-cell body 10 is additionally provided with a bellows section separately above the body and below the body, and the bellows sections have a shock-absorbing function to collapse and to automatically straighten up again. In addition, no less than one hollow tube 101 is provided in the body for connection with tube 101 in the adjacent body 10 or for attaching an inflating valve, a one-way valve, etc. The whole shape of this body 10 may be a square, a circle, multi-sided or a cylinder.

A shock-absorbing cushion composed of a plurality of independent groups of the mono-air-cell bodies has at least one mono-air-cell body provided with a hollow tube especially set aside for attaching an inflating valve, a one-way valve, a pressure-adjusting valve or a pressure gauge. The one-way valve renders it possible to decrease pressure at the same time.

The mono-air-cell body has a hollow interior of a cross-section of any shape sealed except where the connecting tubes are, and is made by means of injecting a material in a die cast mold to form an upper layer, a lower layer and a circumferential side edge to enclose the hollow interior. The air cell inherently has a shock-absorbing function. Also, its shock-absorbing function can remain even if this mono-air-cell body is broken. The outward shape of the mono-air-cell body can be changed according to the design of the die cast mold with which the body is formed. The material can be polyamino-ester, polyethelene, ethylene, vinyl, salt of actate, polyester, chlorinated polyester, chlorinated polyethylene or butyl rubber. Air, fluid, semi-fluid, colloid or elastic foam, plastic or rubber can be filled in the hollow interior of the mono-air-cell body.

If the mono-air-cell body described above is shaped as a cube, its sides are vertical to its upper and its lower surfaces. The shock-absorbing cushion composed of the mono-air-cell bodies can be made in the shape of a band, a net, a plane, a three-dimensional configuration, a cube or a hollow sphere. The male connecting tube is longer than the female connecting tube so that the front end of the male connecting tube extends out of the rear end of the female connecting tube in connecting both the connecting tubes.

Lastly, the features and advantages this mono-air-cell body has are listed below.

1. A plurality of the mono-air-cell bodies can be combined together to make up a whole shock-absorbing cushion.

2. Any mono-air-cell body broken in a shock-absorbing cushion can be replaced with a new one to recover its function.

3. The mono-air-cell bodies can be combined to make up a shock-absorbing cushion shaped as a band, a plane, a cube or a three-dimensional configuration.

4. The interior pressure of a shock-absorbing cushion composed of the mono-air-cell bodies can be adjusted to have a proper shock-absorbing function by filling a gas or a liquid through the one-way valve attached with a mono-air-cell body in the shock-absorbing cushion.

5. A shock-absorbing cushion can be constituted of a plurality of layers laid one on another like blocks, and said layers are composed of the mono-air-cell bodies as wanted.

6. The hollow interior of a shock-absorbing cushion composed of the mono-air-cell bodies can be filled with a different pressure with a gas or a liquid for a different purpose.

7. The drawback of a conventional air-cell cloth residing in the impossibility of replacing a broken air-cell is improved in this mono-air-cell body.

8. This mono-air-cell body has improved the impossibility of adjusting the inner pressure of a conventional air-cell cloth, enabling it to change its shock-absorbing force.

9. This mono-air-cell body can be combined with others to make up a shock-absorbing cushion shaped in three dimensions, which a conventional air-cell cloth cannot do.

What is claimed is:

1. A shock-absorbing unit, comprising: a hollow body having flexible, elastic walls bounding an interior which contains a compressible fluid medium, said body having a first, hollow connecting tube in fluid communication with the interior, said first connecting tube being integral with, and extending upwardly beyond, one of the walls, said first connecting tube having a first fastener thereon, said body having a second, hollow connecting tube in fluid communication with the interior, said second connecting tube being integral with, and extending outwardly beyond, another of the walls, said second connecting tube having thereon a second fastener, each connecting tube having a frusto-conical shape with a maximum diameter at a junction between the tube and the wall with which the tube is integral and being constituted of the same material as the walls of the body, one of said tubes being selectively movable inwardly and outwardly of a respective wall of the body to form an inwardly extending female connecting tube or an outwardly extending male connecting tube for connection respectively to a corresponding male or female connecting tube of another shock-absorbing unit.

2. The shock-absorbing unit as claimed in claim 1, wherein the first and second connecting tubes are co-linear and respectively extend in different directions away from the body.

3. The shock-absorbing unit as claimed in claim 1, wherein the first fastener is an outer, annular groove; and wherein the second fastener is an inner, annular ridge.

4. The shock-absorbing unit as claimed in claim 1, wherein the body has a pair of said first connecting tubes integral with, and extending outwardly beyond, a pair of the walls of the body, said first connecting tubes being co-linear and respectively extending in different directions along a first axis away from the body; and wherein the body has a pair of said second connecting tubes integral with, and extending outwardly beyond, another pair of walls of the body, said connecting tubes being co-linear and respectively extending in different directions along a second axis away from the body, said second axis being generally normal to said first axis.

5. The shock-absorbing unit as claimed in claim 1, wherein the body has a pair of said first connecting tubes integral with, and extending outwardly beyond, a pair of the walls of the body, said first connecting tubes being co-linear and respectively extending in different directions along a first axis away from the body; and wherein the body has a pair of said second connecting tubes integral with, and extending inwardly of, another pair of walls of the body, said second connecting tubes being co-linear and respectively extending in different directions along a second axis away from the body, said second axis being generally normal to said first axis.

6. The shock-absorbing unit as claimed in claim 1, wherein the body is a parallelepiped having six walls.

7. The shock-absorbing unit as claimed in claim 1, wherein the first and second fasteners are snap-on fasteners.

8. A shock-absorbing structure, comprising: a plurality of shock-absorbing units, each including a hollow body having flexible, elastic walls bounding an interior which contains a compressible fluid medium, said plurality including a first body having a first, hollow connecting tube in fluid communication with the interior of the first body, said first connecting tube being integral with, and extending outwardly beyond, one of the walls of the first body, said first connecting tube having a first fastener thereon, said plurality including a second body having a second, hollow connecting tube in fluid communication with the interior of the second body, said second connecting tube being integral with one of the walls of the second body and having a second fastener thereon, each connecting tube having a frusto-conical shape with a maximum diameter at a junction between the tube and the respective wall with which the tube is integral and being constituted of the same material as the walls of the respective body, said second tube being selectively movable between outer and inner positions in which the second tube respective extends outwardly and inwardly of the second body to form a male or female connecting tube respectively, said first and second fasteners detachably mating with each other to form the structure with a predetermined configuration.

9. The shock-absorbing structure as claimed in claim 8, wherein the first body has another second connecting tube co-linear along a first axis with the first connecting tube, and wherein the plurality of bodies are arranged along the first axis to form the structure with an elongated band-like configuration.

10. The shock-absorbing structure as claimed in claim 8, wherein the first connecting tube extends along a first axis, and wherein the first body has another second connecting tube extending along a second axis normally of the first axis, and wherein the plurality of bodies are arranged along the first and second axes to form the structure with a polygonal configuration.

11. The shock-absorbing structure as claimed in claim 8, wherein the first and second fasteners are snap-on fasteners.

12. The shock-absorbing structure as claimed in claim 8, wherein each body includes a pair of expandable and collapsible bellows sections.

13. The shock-absorbing structure as claimed in claim 8, wherein said plurality of bodies are arranged in two independent groups of bodies, each group having an inlet through which the compressible fluid medium passes, and a valve mounted in the inlet to prevent escape of the medium.

14. The shock-absorbing structure as claimed in claim 13, wherein each group is arranged in linear rows, and wherein at least one row of one group is positioned between a pair of rows of the other group.

15. The shock-absorbing structure as claimed in claim 13, wherein each group is arranged in a layer, and wherein each layer is spaced apart of the other layer.

16. The shock-absorbing structure as claimed in claim 15, and further comprising a spacer between the layers.

17. The shock-absorbing structure as claimed in claim 15, wherein each layer has a spherical configuration.

* * * * *